May 4, 1937. H. W. JUSTUS 2,079,412

PILOT VALVE FOR STEAM TRAPS

Filed Oct. 24, 1935

INVENTOR
HENRY W. JUSTUS
BY
ATTORNEY

Patented May 4, 1937

2,079,412

UNITED STATES PATENT OFFICE 2,079,412

PILOT VALVE FOR STEAM TRAPS

Henry W. Justus, Napanoch, N. Y.

Application October 24, 1935, Serial No. 46,490

4 Claims. (Cl. 137—103)

This invention relates to new and useful improvements in a pilot valve for steam traps.

The invention has for an object the construction of a pilot valve which is adapted to snap into open position. This invention has particular application to a contrivance as illustrated in my Patent No. 1,679,309 for a Steam trap granted on July 31, 1928.

I have discovered that unless a pilot valve is provided which snaps into the open position, there is a tendency for the valve to only open part way during the latter stages of the slow collection of condensation in the trap with a resultant undue wearing out of the trap due to unnecessary strains and stresses. Furthermore, it is necessary that the pilot valve snap into open position to obtain efficient operation of the steam trap.

It is an object of this invention to so construct the pilot valve that the steam pressure in the trap is utilized in snapping the valve into the open position.

Another object of the invention is the construction of a device as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Figures 1, 2:
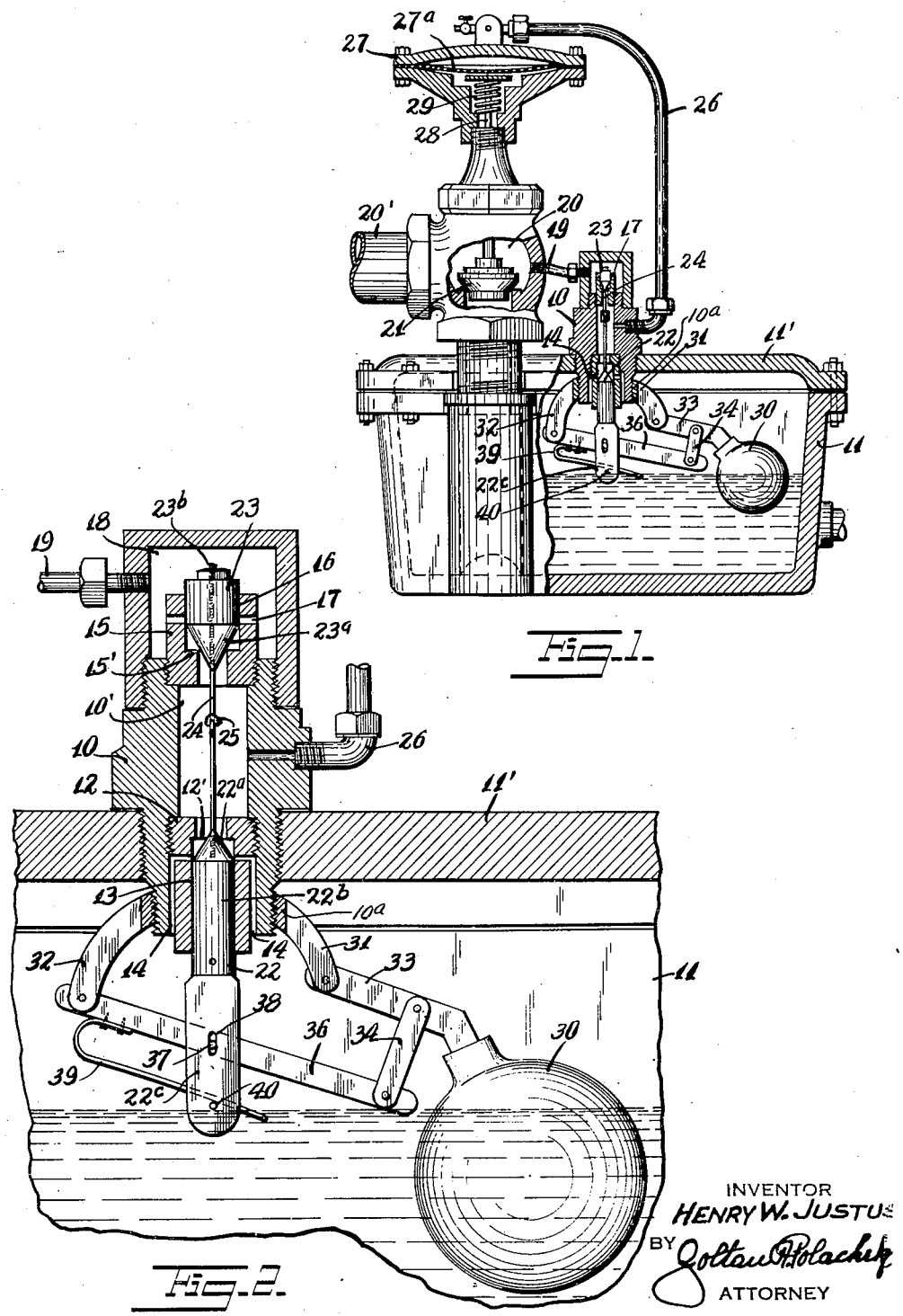
Fig. 1 is a vertical sectional view of a contrivance with a pilot valve embodying this invention.
Fig. 2 is a fragmentary enlarged sectional view of the pilot valve per se.

The pilot valve for steam traps, according to this invention, comprises a valve body 10 adapted to be mounted through the wall 11' of a steam trap 11. A steam valve seat 12' is formed in a bushing 12 mounted upon the inner end of the valve body 10, and communicates with an inwardly extending cylindrical wall 13 from the sides of which there are steam passages 14 which enter the interior of the steam trap 11. A steam release valve seat 15' is formed in a bushing 15 mounted on the outer end of the valve body 10, and communicates with an outwardly extending cylindrical wall 16 from which several steam passages 17 extend to a chamber 18 adapted to be connected by a pipe 19 to a near point of a condensation return line 20 and 20'. The return line 20 and 20' is controlled by an automatic valve 21 as hereinafter further described.

A steam valve 22 consists of a conical portion 22ª engageable upon said steam valve seat 12' and a cylindrical portion 22ᵇ engaging the said cylindrical wall 13, and in a closed position of the valve covering the said steam passage 14, and in an open position of the valve exposing said steam passage 14. A steam release valve 23 consists of a conical portion 23ª engageable upon the said steam release valve seat 15', and a cylindrical portion 23ᵇ engaging said cylindrical wall 16, and in a closed position of the valve covering said release passages 17 and exposing only a portion of the conical portion 23ª to the steam from the trap, while in a slightly opened position exposing the entire conical portion to the trap steam.

A means is provided for connecting the valves 22 and 23 for unitary motion so that when one opens, the other closes. This means comprises a connecting rod 24 attached at its ends to the valves respectively. This connecting rod has a universal joint 25 interposed intermediate of its ends so that there is no interference to the proper seating of the valves. A pipe line 26 is connected from the space 10' between the valves 22 and 23 and extends to the top of a diaphragm control device 27 which controls the valve 21. Within the diaphragm device 27 there is the diaphragm 27ª which is connected with a valve stem 28 which operates the valve 21. A spring 29 normally urges the valve 21 into an open position to allow the water to be blown out, but the action of the steam against the diaphragm 27ª normally holds the valve 21 in a closed position.

A float 30 is located within the steam trap 11. This float 30 is connected by a linkage system to operate the valve 22 and includes an arrangement to provide a certain amount of lost motion or play. Thus, the float 30 may be lifted or dropped through certain distances before the valve 22 is moved. This linkage consists of a pair of substantially diametrically opposite arms 31 and 32 fixedly mounted on a ring 10ª which threadedly engages the inner end of the body 10. A lever 33 is connected at one end to the float 30 and at the other end pivotally upon the arm 31. A link 34 is connected intermediate the link 33 and is substantially parallel to the arm 32 and connects with an arm 36 which is pivotally connected at its other end upon the arm 32. A pin 37 projects from the arm 36 and engages in an elongated slot 38 in an extension stem 22ᶜ of the valve 22. It is this slot which permits the float to move through a certain distance without directly moving the valve.

A spring 39 is attached upon the lever 36 and has its free end engaging a pin 40 projecting from the stem 22c and normally urging the valve 22 downwards into an open position and is of sufficient strength to hold the valve 22 open against the closing effect produced by the trap steam engaging the small exposed portion of the valve 23. The spring 39 is of insufficient strength to hold the steam from the trap when acting against the entire cone portion 23a from closing the valve 22.

The valve seat 15' and passages 17 are formed in said bushing 15 which is threadedly mounted on said valve body 10. The valve seat 12' and passages 14 are formed in said bushing 12 which is threadedly mounted on said valve body 10.

The operation of the device is as follows:—In the condition of the device shown in Fig. 2, trap steam may pass from the trap 11 through the passages 14 to the chamber 10' and then along the pipe 26 to the top of the diaphragm 27a, and hold the valve 21 close so that water from the trap cannot blow out. The steam pressure from the trap against the small exposed portion of the valve portion 23a is inadequate to lift the valve 23 against the holding of the spring 39.

When the water level in the trap 11 reaches a predetermined amount the pin 37 will strike the top of the slot 38 and slightly lift the valves 22 and 23. Instantly, the steam pressure from the trap acts against the entire portion 23a and snaps the valve 23 open and the valve 22 closed. The pressure of steam above the diaphragm 27a now escapes through the pipe 26, the passages 17, and the pipe 19 to the blow off 20 and 20'.

The spring 29 then opens the valve 21 and the water of condensation from the trap blows off until the water level in the trap has fallen sufficiently for the pin 37 to strike the bottom of the slot 38. Then the valve 22 is opened and the valve 23 closed by the downward motion of the float 30. The steam from the trap then passes through the pipe 26 to the top of the diaphragm 27a and closes the valve 21. Condensed water now again collects in trap lifting the float and the device is now ready to repeat its operation.

While I have illustrated and described the preferred embodiment of my invention, it is to be understood that I do not limit myself to the precise construction herein disclosed and the right is reserved to all changes and modifications coming within the scope of the invention and defined in the appended claims.

Having thus described my invention, what I claim as new, and desire to secure by United States Letters Patent is:—

1. In a pilot valve for steam traps, a valve body mounted through the wall of a steam trap, a valve mounted in said valve body, a float for location in said steam trap, and linkage interposed between said float and said valve and having a certain amount of lost motion to control the movement of said valve, comprising fixed fulcrum bearing arms mounted on the inner end of said valve body, a lever connected to one of said fixed fulcrum bearing arms and with said float, a lever connected with the other of said fixed fulcrum bearing arms and having a pin engaging a slot in a stem extending from said valve, a link connecting the latter-mentioned lever with the lever supporting said float, and resilient means normally urging said valve into an open position.

2. In a pilot valve for steam traps, a valve body mounted through the wall of a steam trap, a valve mounted in said valve body, a float for location in said steam trap, and linkage interposed between said float and said valve and having a certain amount of lost motion to control the movement of said valve, comprising fixed fulcrum bearing arms mounted on the inner end of said valve body, a lever connected to one of said fixed fulcrum bearing arms and with said float, a lever connected with the other of said fixed fulcrum bearing arms and having a pin engaging a slot in a stem extending from said valve, a link connecting the latter-mentioned lever with the lever supporting said float, and resilient means normally urging said valve into an open position, comprising a spring mounted upon the lever having the pin engaging the slot, and acting against the extended stem of said valve.

3. In a pilot valve for steam traps, a valve body mounted through the wall of a steam trap, a valve mounted in said valve body, a stem extending from said valve into said trap and having a slot therein, a float for location in said steam trap, fixed fulcrum bearing arms mounted on said valve body, a lever connected with one of said fixed fulcrum bearing arms and said float, a lever connected with the other of said fixed fulcrum bearing arms, a pin on said latter-mentioned lever and engaging said slot, a linkage connecting the latter-mentioned lever with the lever supporting said float, and a spring mounted upon the lever having the pin engaging said slot, and acting against the extended stem of said valve to normally urge said valve into an open position.

4. In a pilot valve for steam traps, a valve body mounted through the wall of a steam trap, a valve mounted in said valve body, a stem extending from said valve into said trap and having a slot therein, a float for location in said steam trap, fixed fulcrum bearing arms mounted on said valve body, a lever connected with one of said fixed fulcrum bearing arms and said float, a lever connected with the other of said fixed fulcrum bearing arms, a pin on said latter-mentioned lever and engaging said slot, a linkage connecting the latter-mentioned lever with the lever supporting said float, and a spring mounted upon the lever having the pin engaging said slot, and acting against the extended stem of said valve to normally urge said valve into an open position, said levers having a certain amount of lost motion and with the aid of said spring control the movement of said valve.

HENRY W. JUSTUS.